(No Model.)
P. D. DUPONT.
FORK FORMING MACHINE.
No. 312,984. Patented Feb. 24, 1885.
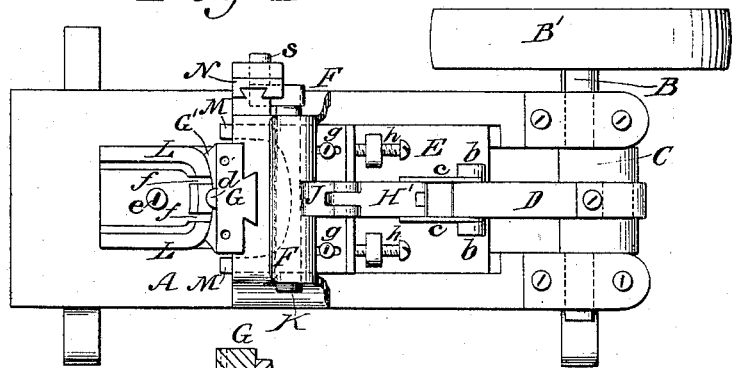
WITNESSES:
INVENTOR:
P. D. Dupont
BY Munn & Co
ATTORNEYS.

UNITED STATES PATENT OFFICE.

PHILIPPE DÉNÉRY DUPONT, OF SUMMERVILLE, VERMONT.

FORK-FORMING MACHINE.

SPECIFICATION forming part of Letters Patent No. 312,984, dated February 24, 1885.

Application filed June 5, 1884. (No model.)

*To all whom it may concern:*

Be it known that I, PHILIPPE DÉNÉRY DUPONT, of Summerville, in the county of Caledonia and State of Vermont, have invented certain new and useful Improvements in Fork Forming or Shaping Machines, of which the following is a full, clear, and exact description.

This machine is for the purpose of forming or shaping from suitably-prepared blanks different kinds of forks or fork-like implements for agricultural purposes, including spade-forks, potato-diggers, and others.

This forming or shaping of such implements has heretofore been done by hand; and my invention consists in certain constructions and combinations of mechanism in an organized machine for the purpose, whereby the same machine answers for forming or shaping different kinds and sizes of forks, the work is done better, neater, and very much quicker than by hand, and the prongs are made more regular, smooth, and even, there being no hammering to injure the evenness of them, substantially as hereinafter described.

Reference is to be had to the accompanying drawings, forming part of this specification, in which similar letters of reference indicate corresponding parts in all the figures.

Figure 1 represents a plan of a machine embodying my invention; Fig. 2, a central longitudinal vertical section of the same, and Fig. 3 a front end view thereof. Fig. 4 is a top view of a fork-blank suitable for operation by the machine.

A is the bed or table which carries the operating mechanism, and B its main or driving shaft, on which is a balance-wheel or pulley, B', and which is constructed or provided with a crank, C. From the crank C is a connecting-rod, D, jointed, as at $b$, to a horizontal slide, E, which, actuated by the crank, reciprocates in and along ways in or on the table A.

F is an upright frame mounted on the table A, and having fitted to slide up and down within it a die or presser carrier, G, to which motion is communicated from the slide E through links $c\ c$ by toggle-levers H H', arranged to work in a vertical plane, and the lower one, H, of which is attached below to a rock-shaft, I, working in fixed bearings, while the upper one, H', is connected above to an arm or lever, J, on a horizontal rock-shaft, K, in the fixed frame F, which arm has a free or loose joint connection with the slide or carrier G, that is moved up and down as the toggle-levers H H' are flexed in and out. The greatest force or power of this carrier G is at or toward the limit of its downstroke, to give the necessary pressing action to a flat or straight die, G', on the work, which die or presser is secured on a recessed face portion of the carrier G, and made adjustable by slot and set-screw $d$ up and down thereon to adapt it to its hold or pressing action on the work upon the table A immediately behind a raised stationary U-shaped former, L, removably secured by a screw, $e$, on the table. This former corresponds with the general configuration of the fork, and has as many grooves, $f$, in or through its acting bent ends as there are intermediate prongs in the fork. The fixed former L (shown in the drawings) has two grooves, $f$, in it, and is suitable for making a four-pronged fork. When three, five, or six pronged forks have to be made, said former L is replaced by other formers provided with as many grooves, $f$, as there are inside prongs, and for a two-pronged fork said grooves are altogether omitted.

Upon the forward portion of the horizontal plate or slide E is secured, by screws $g$, fitting through slots therein and adjustable by set-screws $h$, a concave U-shaped former, M, that when forced up by the motion of said slide presses and bends the fork-blanks around or on the outside of the stationary former L. This concave-shaped moving former M and the presser or die G' are replaced by others as required to adapt them to work in connection with different fixed formers L.

In the operation of the machine a fork-blank, substantially as shown in Fig. 4 when a four-pronged fork is required to be made, is heated to a red heat and placed crosswise on the table A immediately behind the former L, with its shank portion $l$ arranged to face the working former M, and so that it will enter a centering hole or recess, $m$, therein, and the prong portions $n\ n$ of the blank fit within the grooves $f$ $f$ of the former L, and the bar portion $o\ o$ of the blank lies immediately beneath the die or presser G'.

The machine being put in motion, the traveling former M as it moves forward causes the bar portion $o\ o$ of the blank to be bent around the convex end of the stationary former L, and thereby to form the outside prongs of the fork. During this action the die or presser G' comes down and bears flatly on the bar portion o o of the blank, which does away with all roughness on the surface of the blank.

On one end of the rock-shaft K is a crank, s, which serves to give a slight up-and-down movement to a side die, N, that works in a guideway on the upright frame F, for use in concert with a lower stationary die, N'. These dies are constructed on their adjacent faces to conform to the shape and size of the prongs, and are used to straighten out the inside prongs of the fork when the same have been crooked after passing through the former L. This dispenses with work of the hand-hammer for the purpose.

A machine constructed as I have here described will readily make different kinds of forks by suitably changing the formers and dies. It forms or shapes the work better, neater, and very much quicker than can be done by hand, and performs its work with absolute evenness and regularity, as the prongs are both pressed and formed into shape at the same time, and there is no hammering to injure their evenness.

Having thus described my invention, what I claim as new, and desire to secure by Letters Patent, is—

1. In a machine for forming or shaping forks, the combination of the raised stationary U-shaped former L, made either with or without one or more grooves, f, in it, the bed or table A, and the concave-shaped reciprocating former M, having a centering hole or recess, m, for the shank of the fork-blank, substantially as specified.

2. In a machine for forming or shaping forks, the combination, with the table A, of the presser or die G', having an up-and-down motion, as described, the raised stationary former L, arranged upon the table or bed, and the concave reciprocating former M, for operation in relation with each other, essentially as and for the purposes herein set forth.

3. The combination of the sliding die or presser carrier G, the adjustable die or presser G' thereon, the slide or reciprocating plate E, with its adjustably-attached former M, the toggle-levers H H', and arm or lever J, connected therewith, one or more links, c, the stationary raised former L, and the bed or table A, essentially as specified.

4. In combination with the stationary raised former L, reciprocating former M, and presser or die G', the moving side die, N, and stationary side die, N', substantially as and for the purposes specified.

5. The combination, with the presser or die carrier G and its attached die or presser G', of the rock-shaft K, with its attached crank s, the reciprocating side die, N, stationary die N', the arm or lever J, the slide E, and the toggle-levers H H', essentially as shown and described.

PHILIPPE DÉNÉRY DUPONT.

Witnesses:
 EMILE TARDIVEL,
 J. S. DURANT.